INVENTORS.
*Max Bruno Nebel &*
*Erhard M. Nebel,*

*Paul & Paul*
ATTORNEYS.

INVENTORS.
Max Bruno Nebel &
Erhard M. Nebel,

ATTORNEYS.

INVENTORS.
Max Bruno Nebel &
Erhard M. Nebel,

Paul & Paul
ATTORNEYS.

FIG_26_

FIG_27_

United States Patent Office 3,430,463
Patented Mar. 4, 1969

3,430,463
METHOD AND APPARATUS FOR MAKING RUN-RESISTANT KNITTED FABRIC
Max Bruno Nebel and Erhard M. Nebel, Wiesbaden, Germany, assignors to Hanes Corporation, a corporation of North Carolina
Continuation-in-part of application Ser. No. 173,419, Feb. 15, 1962. This application Aug. 17, 1962, Ser. No. 217,554
Claims priority, application Germany, Feb. 18, 1961, N 19,623
U.S. Cl. 66—42          27 Claims
Int. Cl. D04b 9/46, 15/32

ABSTRACT OF THE DISCLOSURE

Method of knitting run-resistant fabric for ladies' hosiery and the like where, in the knitting sequence, a first course of fabric is formed entirely of relatively small, plain knit stitches, and then a second course is formed of relatively large spaced tuck loops and intervening stitches. The length of yarn per course of the first knit course in the sequence is about 70% or less of the length of yarn per course of the second knit course. As a result, spaced stitches in the first knit courses are robbed of yarn to such extent that they recede into their respective previous stitches.

This application comprises a continuation-in-part of our earlier patent application Ser. No. 173,419 filed Feb. 15, 1962, now abandoned.

A principal object of this invention is to provide a highly run-resistant fabric having an attractive appearance in which the loop formation increases the stitch security and the walewise extensibility of the fabric.

Another object is to provide a circular-knit lady's stocking made wholly or partially of such run-risistant fabric.

Another object is to provide an improved method of making run-resistant fabric whereby selected stitches of a course of relatively short thread length may be extended and doubled with comparatively long tuck loops of the next following course having a relatively long thread length, without breaking the thread of the first course.

Another object is to provide such an improved method involving drawing the loops of the short and long thread courses, respectively, over special sinker ledges appropriately different in height.

Another object is to provide such an improved method involving drawing the loops of the short and long thread courses, respectively, by needles controlled by stitch cams set at appropriately different stitch drawing levels.

Another object is to provide such an improved method involving the use of at least one stitch cam that is movable independently of a needle cylinder and sinkers, whereby a stocking may be fashioned by selectively controlling the size of the stitches in different courses of the fabric as knitting progresses toward the toe.

Another object is to provide improved apparatus for producing the improved fabric and stocking and for practicing the improved methods aforesaid.

Other objects of the invention will become apparent when the following description is read with reference to the accompanying drawings, in which.

The terms "stitch" and "knitted stitch" as used throughout the specification and claims hereof shall indicate a loop of yarn which has been pulled through a preceding loop of yarn.

The term "casting off" shall indicate the discharge of a loop of yarn from a needle as a newly formed loop of yarn is pulled through the discharged loop to form a stitch.

Figure 1:
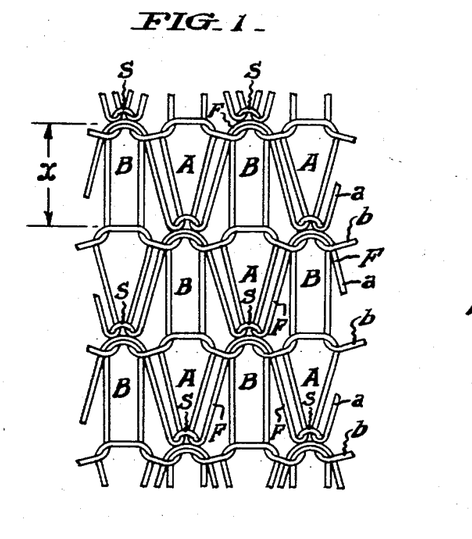
FIG. 1 is a fragmentary, schematic view of a run-resistant fabric made in accordance with this invention, the same being stretched walewise.
Figure 1A:
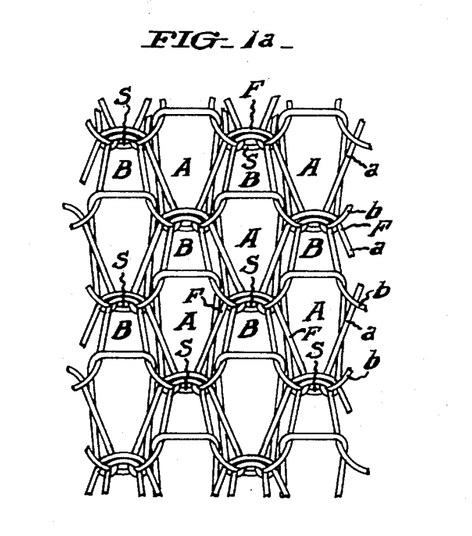
FIG. 1a shows schematically the same type of fabric unstretched.

The term "unknitted stitch" shall indicate a stitch which has been pulled out of its original loop formation and has receded completely (as shown in FIG. 1a), or nearly completely, into a previous stitch or yarn loop. An "unknitted stitch" may have a slight loop formation, depending upon the amount of yarn drawn or "robbed" from it. When a fabric containing unknitted stitches is subjected to substantial tension or stretch, the unknitted stitches tend to "reknit," i.e., tend to form into small yarn loops (as illustrated in FIG. 1). The size of such "reknit" yarn loops is dependent upon the extent to which the original stitches had been robbed of yarn during unknitting, and also the degree of stretch imposed on the fabric.

The term "stitch draw level" shall indicate the lowest level to which a needle descends in casting off a stitch or yarn loop.

The term "clearing level" shall indicate the level to which a needle rises to clear yarn from its latch.

The term "tuck level" shall indicate the level to which a needle rises to take yarn while retaining a loop of yarn on its latch.

The terms "thread" and "yarn" are used as synonyms throughout the specification and claims hereof.

FIG. 1 shows a run-resistant fabric constructed in accordance with this invention stretched lengthwise (i.e. walewise) in such a way that all the knitted stitches are in loop formation to some extent. This fabric consists of courses $b$ alternating with courses $a$. In the courses $b$ the thread length per course preferably does not exceed 70% of the thread length per course in the courses $a$. A course $b$ consists of elongated stitches B alternating with short locking, i.e. "unknitted," stitches S, while a course $a$ consists of stitches A alternating with tuck loops F. The tuck loops F have substantially the same size, i.e. length $x$ as the stitches A, and are doubled with stitches B throughout the fabric.

It will be seen that the short locking stitches S are anchored by the stitches A throughout the fabric. A locking of the stitches A in the fabric structure is achieved by forming the stitches A in alternate wales of the courses $a$ and by extending the intervening stitches B of the preceding courses $b$ over two courses, obtaining the necessary supply of yarn to thus elongate stitches B from the neighboring stitches S. As a result, the stitches S are contracted to such an extent as to form short stitches which lock the stitches A.

The forming of courses $a$ and $b$ with different lengths of yarn per course, and the forming of the small stitches S, create a stress relationship on the yarn loops such that the needle stitches are hindered from running and forming ladders during wear. This loop structure, when made from fine threads, gives the knitted fabric a fine, net-like appearance.

The length of the thread per course in the courses $b$ in relation to the thread lengths of the courses $a$ must not be so great as to prevent the fabric from having the desired run-resistant property, and must not be so small as to lead to overtensioning or breaking of the thread during knitting. Basically, the thread lengths of courses $b$ must be short enough relative to the thread lengths of courses $a$ so that courses $b$ take all the strain that can be placed on the fabric in any direction, i.e., courses $a$ must be so loose that the threads making up these courses are never tensioned sufficiently to pull stitches A back through stitches S, if a thread is broken, irrespective of how the fabric is pulled. The greater the tension on the fabric, the more the locking stitches S of the courses $b$ are pulled tight, in consequence of which ladders or runs for all practical purposes are prevented. In order to achieve this desideratum, it has been found in practice that the length of yarn per course of the courses $b$ preferably should be from 45% to 70% of the length of yarn per course of the courses $a$.

By using a mesh pattern with one needle step in knitting from courses $a$ to courses $b$, every needle wale contains, sequentially, stitches A, elongated stitches B, tuck loops F and locking stitches S. As a result, in the fabric of FIG. 1, the stitches A and tuck loops F of each course $a$ are staggered, i.e., offset walewise, with respect to the stitches A and tuck loops F of the next adjacent courses $a$. Similarly, the stitches B and S of the courses $b$ are staggered with respect to the stitches B and S of the next adjacent courses $b$.

It may be found advantageous to knit an additional reinforcement thread with the courses $b$ and/or with the courses $a$.

In the fabric of FIG. 1, the ratio of the length of yarn per course of the "short yarn" courses $b$ to the length of yarn per course of the "long yarn" courses $a$ is about 67%. The same fabric is shown in FIG. 1a, but the yarn length ratio is approximately 50%. In the latter fabric, the locking stitches S unknit to such extent as to recede completely into their respective previous stitches when the fabric is relaxed. The extent to which the stitches S become unknitted and recede back into the previous stitches in a wale depends upon the ratio of the thread lengths of the courses $b$ to the thread lengths of the courses $a$.

Figure 2:
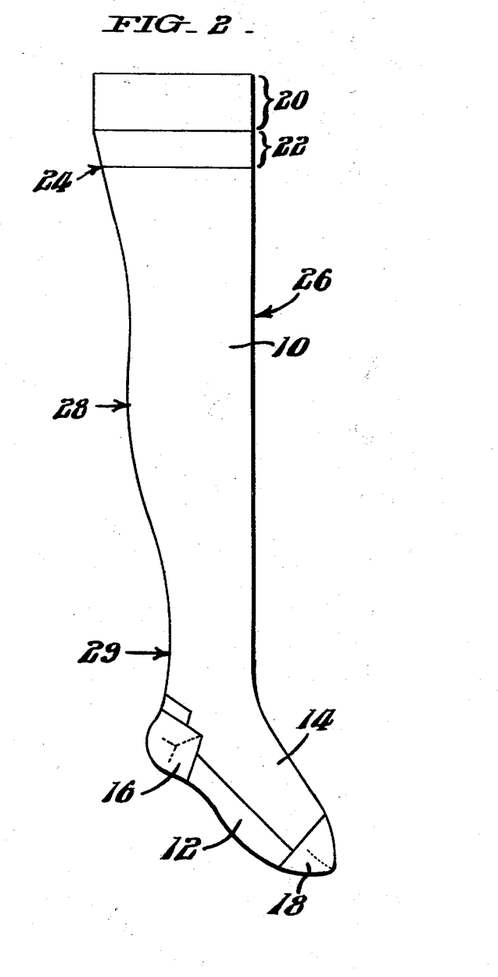
FIG. 2 is a view in side elevation of a lady's circular knit stocking made in accordance with this invention.

Referring to the exemplary lady's stocking shown in in FIG. 2, the leg portion 10, the sole portion 12 and the instep portion 14 of the stocking may be made of run-resistant fabric according to the invention, while the heel portion 16 and the toe portion 18 may be of conventional fabric. The welt 20 and the shadow welt 22 also may be of conventional fabric, knitted with a heavier thread, if desired. The circumference of the stocking may vary in size. For example, the upper portion of the leg from the area of numeral 24 to the knee area 26 may be knitted to include relatively large yarn loops to form a relatively large circumference, and the portion from the knee area 26 to the middle of the calf 28, or down to the ankle 29, may be knitted with gradually smaller loops to form a circumference of progressively decreasing size. From there on the loops and circumference may remain of the same size through the foot portion 12, 14 to the toe 18.

A further construction is one in which the toe portion 18 also consists of run-resistant fabric in tubular form, shaped by cutting off the surplus fabric and seaming.

A further construction is one in which the heel portion 16 is tubular knitted of run-resistant fabric and boarded to shape. The fabric of the heel portion 16 may be knitted with an additional thread as reinforcement, and, if desired, this reinforcement may be extended into the sole portion 12.

Production of the run-resistant fabric of FIGS. 1, 1a, involves, first, forming on a set of needles a course $b$ initially of substantially equal size yarn loops which are to form the short unknitted stitches S and the elongated stitches B. Then there is formed on the needles a course $a$ of stitches A and tuck loops F, all of greater loop length than the loops of the first course $b$. As course $a$ is formed, loops of the course $b$ are cast off from those needles which form the stitches A, while loops of the course $b$ are retained on the needles which form the tuck loops F. The retained loops are enlarged to form the elongated stitches B by robbing or drawing thread from the castoff stitches, thereby contracting said cast-off stitches to form them into the small locking or unkitted stitches S. As will be more fully explained, the formation of the fabric is illustrated schematically in FIGS. 13–18.

The result of this method is that the loops of the course $b$ which remain on the needles are pulled down, during the sinking of the course $a$, with the tuck loops F, and therefore are drawn to approximately the same loop length as loops F and A to form the elongated stitches B at the expense of the stitches S.

For practicing the method of the invention on a circular machine, sinkers may be used which have yarn sinking points at two different heights, either both behind a sinker neb or hook or one in front of and the other behind the sinker neb.

It is highly advantageous to achieve this method of operation with the aid of sinkers P (FIGS. 3 and 4), which have behind their nebs $ph$ differential yarn sinking ledges $pa$, $pt$ joined by an inclined edge $pc$, and before their nebs $ph$ a yarn sinking ledge $pd$ at the same height as the ledge $pt$. Preferably, the sinking ledges $pa$ and $pt$ have a difference in height corresponding to the difference between the loop lengths of the courses $a$ and courses $b$ as initially formed.

Figure 5:
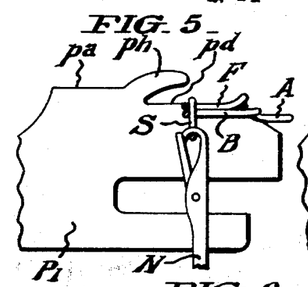
Figure 6:
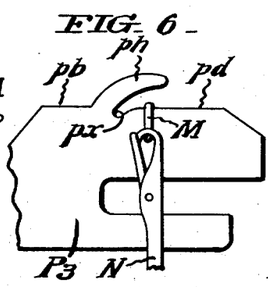
Figure 7:
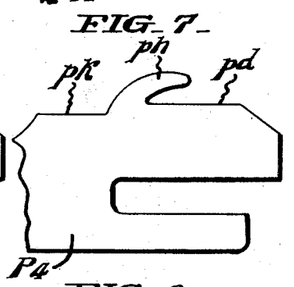
Figure 8:
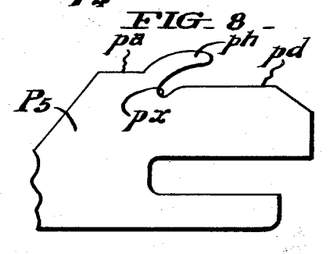
Figure 9:
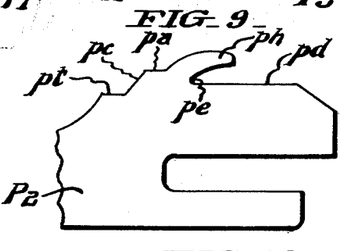

Other forms of sinkers are useful too. FIG. 5 shows another preferred sinker P1 having only one yarn sinking ledge $pa$ behind its neb $ph$, which sinking ledge is higher than the sinking ledge $pd$ before the sinker neb. FIG. 6 shows a sinker P3 with a yarn sinking ledge $pb$ behind the sinker neb $ph$ at the same height as the ledge $pd$ before the neb. The sinker ledge $pd$ terminates in a notch $px$, next to the neb $ph$. FIG. 7 shows a sinker P4 with a yarn sinking ledge $pk$ behind the sinker hook $ph$, lower than the sinking ledge $pd$ before the sinker hook. FIG. 8 shows a sinker P5 which is similar to sinker P1 (FIG. 5), except for the presence of the notch $px$. FIG. 9 shows a sinker P2 which is similar to the sinker P, except that the sinking ledge $pt$ is lower than the ledge $pd$.

Figure 3:
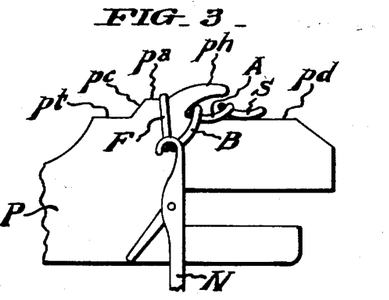
FIGS. 3–9 are fragmentary views in side elevation showing different forms of sinkers constructed in accordance with this invention.
Figure 10:
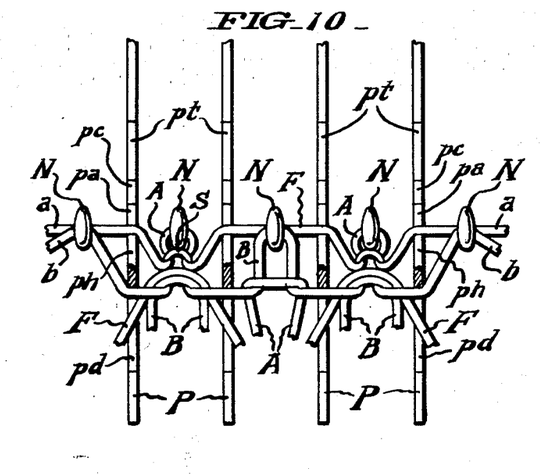
FIG. 10 is a fragmentary view in top plan showing sinkers of the type illustrated in FIGS. 3 and 4 with a portion of the sinker nebs broken away.

FIGS. 3 and 10 show the completion of the sinking of the loops of the thread of a course $a$, with the sinkers P. Needle N in FIG. 3 is at stitch draw level. This course $a$ is formed, by the needles, behind the sinker nebs $ph$ on the sinking points $pa$ (which lie higher than the sinking points $pd, pt$) into tuck loops F and stitches A in alternation. Stitches B of a course $b$, which had remained on the latches of the alternate needles that produce the tuck loops F, lie in front of the sinker nebs $ph$ on the lower sinking points $pd$ and are pulled down by the needles a distance less than that of stitches A and tuck loops F because of the difference in height of ledges or sinking points $pa$ and $pd$. Since the needles sink the loops of course $a$ behind the sinker nebs $ph$, and the stitches B of course $b$ extend from the sinker throats to the needles, it is apparent, from FIG. 3, that as tuck loops F are formed, stitches B are enlarged to approximately the same loop length as tuck loops F, since the needles pull stitches B slightly rearwardly of the sinker throats. With the method shown in FIG. 3, strain or tension on the loops B is reduced during sinking of the tuck loops F.

Figure 4:
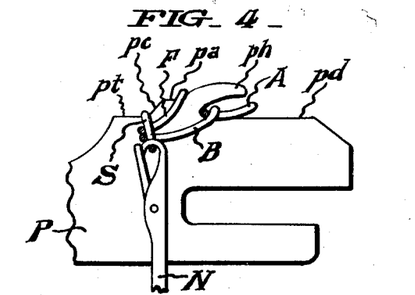

FIG. 4 shows the completion of the sinking of a loop S of a course $b$, with the sinkers P. Needle N in FIG. 4 also is at stitch draw level, casting off simultaneously a stitch B and a tuck loop F. The loops of course $b$ are formed into the alternate stitches B and S behind the sinker nebs $ph$ on the sinking points or ledges $pt$. Stitches B and S initially are formed of the same size by the sinking of the yarn of course $b$ on the sinking ledges $pt$.

Thus, from FIGS. 3, 4 and 10, it is clear that the stitches B and S of a course $b$ initially are of the same size, and when the stitches B are pulled downwardly a second time, on the sinking ledges $pd$, during formation of the tuck loops F of a course $a$, they (stitches B) are enlarged by drawing yarn from the intervening stitches S which are cast off during formation of the course $a$. The needle action is similar to that shown in FIGS. 13–18. In FIG. 10, stitches S actually are unknitted, but have been shown in slightly exaggerated loop formation for the purposes of clarity.

For producing the loops of a course $a$ with sinkers P, the sinkers, by well known cam means, are moved forward between the needles N to bring their yarn sinking ledges $pa$ under the yarn feed for that course. Similarly, for producing the loops of a course $b$, the sinkers P are advanced slightly further into the needle circle to permit sinking of yarn on the ledges $pt$. Before formation of the next successive course $a$, however, the sinkers P are retracted outwardly by well known cam means to transfer the loops of the newly formed courses $a$ and $b$ from the sinking ledges behind the sinker nebs to the sinking ledges $pd$ in front of the sinker nebs. Immediately thereafter, sinkers P again are advanced into the needle circle to permit formation of the loops of a new course $a$ on the yarn sinking ledges $pa$.

With respect to sinkers P, the difference in height between the sinking ledges $pa$ on the one hand and ledges $pd$ and $pt$ on the other hand may be in direct proportion to the desired difference in yarn length per course of the courses $a$ and $b$. For example, if it is desired that a fabric be knitted wherein, at least in the initial courses, the ratio of the length of yarn in a course $a$ to the length of yarn in a course $b$ is 2:1, i.e., the length of yarn in a course $b$ is 50% of the length of yarn in a course $a$, then the height of sinking ledge $pa$, in comparison to the height of the sinking ledges $pd$ and $pt$, may be such as to form a yarn loop on sinking ledge $pa$ which would be twice the length of a yarn loop formed on the sinking ledges $pd$ or $pt$. This assumes, of course, that the stitch draw levels for courses $a$ and $b$ are the same during formation of the said initial courses.

In view of the novel method of fashioning circular knitted fabric, to be described hereinafter, wherein plural stitch cams are adjustable independently relative to a needle cylinder and to each other, the ratios of the yarn lengths in courses $a$ and $b$ may be selectively varied with any given set of sinkers by appropriate control and adjustment of the stitch cam positions.

FIG. 5 shows a method of producing a course $b$ of the fabric of FIGS. 1, 1$a$, with sinkers P1. The usual sinker ledge $pd$ lies before the sinker neb $ph$ at the usual level, and is the sinking point for the loops for stitches S, B of a course $b$. The higher ledge $pa$ behind the neb $ph$ provides the sinking point for the yarn loops of a course $a$. The needle N in FIG. 5 also is at stitch draw level, and is shown casting off a tuck loop F and a stitch B.

The motion of the sinkers P1 is such that during the production of a course $b$ on ledges $pd$ the sinkers are actuated in the usual way in relation to the needles and for the production of a course $a$ the sinkers P1 are advanced into the needle circle to enable the needles to sink yarn on the ledges $pa$ behind the nebs $ph$. The needle action, of course, connected with the use of sinkers P1, is similar to that shown in FIGS. 13–18.

Referring now to FIG. 9, the sinker P2 has behind its neb $ph$ sinking ledges $pt$ and $pa$, which are connected by the inclined edge $pc$ and, in contrast with sinker P (FIG. 3), the sinking ledge $pd$ is located at a level which lies intermediate of the level of the sinking ledges $pt$ and $pa$.

With the sinker P2, a somewhat better casting off of the stitches A of a course $a$ can be obtained because the sinking ledge $pt$ for courses $b$ lies a little lower than the sinking ledge $pd$. Thus, the needles, during the production of a course $b$, can be drawn lower than during the production of a course $a$ without forming loops of too large a size. By this method the stitches B will be less strained when drawn down the second time, and may easily draw their additionally required thread length from the cast off stitches S. During this second sinking motion, the stitches B are elongated to a size which substantially corresponds to the size of the loops of course $a$, and the stitches S are contracted in the manner shown in FIG. 10.

Referring to FIG. 7, sinker P4 may be used with a sinking point $pk$, behind the hook $ph$, which lies lower than the usual sinking point $pd$ in front of the hook $ph$. With this sinker, the thread for courses $a$ is formed in front of the neb on sinking point $pd$ and the thread for courses $b$ is pulled on the lower-lying sinking point $pk$ by means of the needles.

Figure 11:
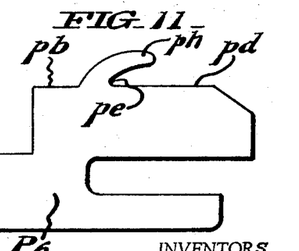
FIG. 11 is a fragmentary view of a conventional sinker.

According to a further embodiment of this invention, instead of using sinkers with yarn sinking points at two different heights in a circular knitting machine with two or more yarn feeds, the fabric of FIGS. 1, 1$a$ may be knit with the conventional sinkers P6 shown in FIG. 11, by positioning the knitting cams so that the stitch cam at the feed for forming courses $b$ is adjusted higher, in the direction of needle motion, than the stitch cam at the feed for forming courses $a$. In such method of the invention, either or both of the co-planar yarn sinking ledges $pd, pb$ of sinker P6 may be utilized for sinking the yarn.

Figure 12:
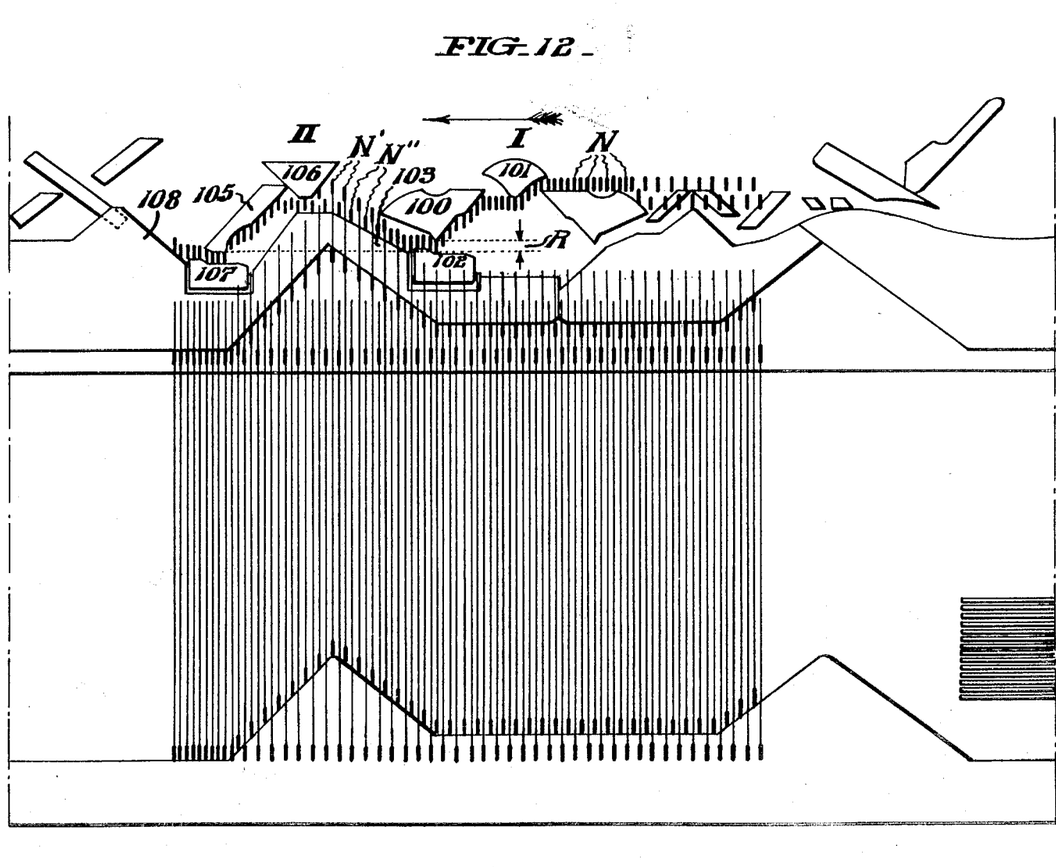
FIG. 12 is a fragmentary, schematic development in elevation illustrating one preferred arrangement of knitting cams, in accordance with this invention, in a circular knitting machine.

This further method of the invention is illustrated in FIG. 12 and in FIGS. 13–18. FIG. 12 shows schematically one preferred setting of the knitting cams for forming the fabric of FIGS. 1, 1$a$. Yarn for the "short yarn" courses $b$ is fed to the needles N at yarn feeding station I having a stitch cam 100, a top center cam 101, a landing cam 102 and a rise cam 103. Yarn for the "long yarn" courses $a$ is fed at yarn feeding station II which includes stitch cam 105, top center cam 106, landing cam 107 and a rise cam 108.

Stitch cam 105 is positioned to draw the needles down to a lower level than that to which they are drawn by stitch cam 100. The difference in drawing depth of the two stitch cams 105, 100 is indicated at R. Thus, stitch cam 105 will draw the needles downwardly to form a course of longer loops and greater yarn length than that of a course formed at yarn feeding station I. Of course, if desired, the arrangement of FIG. 12 may be reversed so that the "long yarn" courses are formed at station I and the "short yarn" courses are formed at station II.

Figure 13:
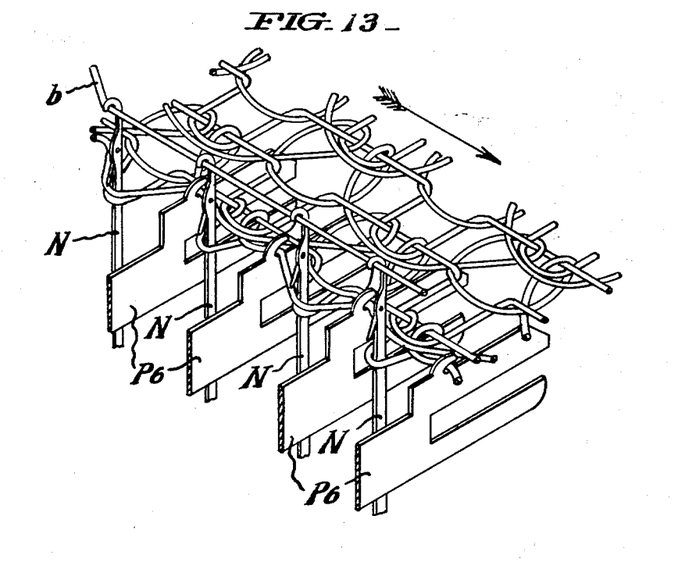
FIGS. 13–18 are fragmentary, schematic views in perspective showing action of the needles pursuant to the stitch cam arrangement of FIG. 12.
Figure 14:
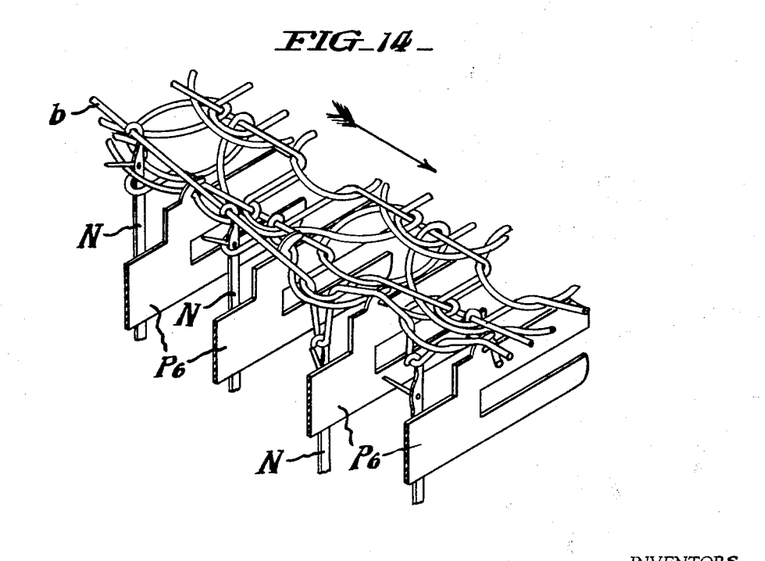
Figure 15:
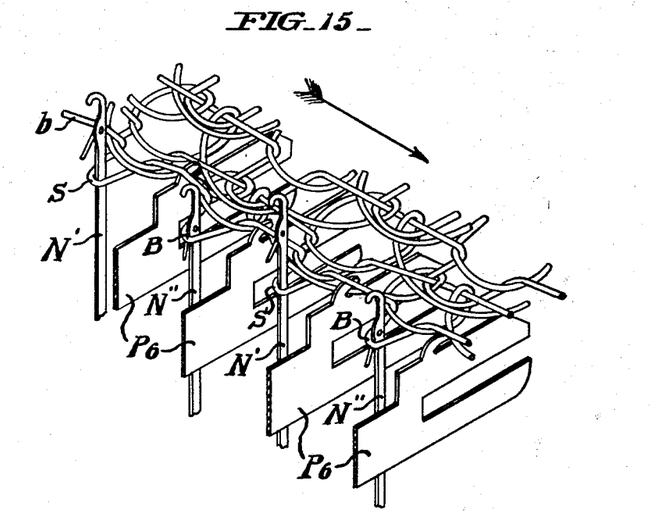
Figure 16:
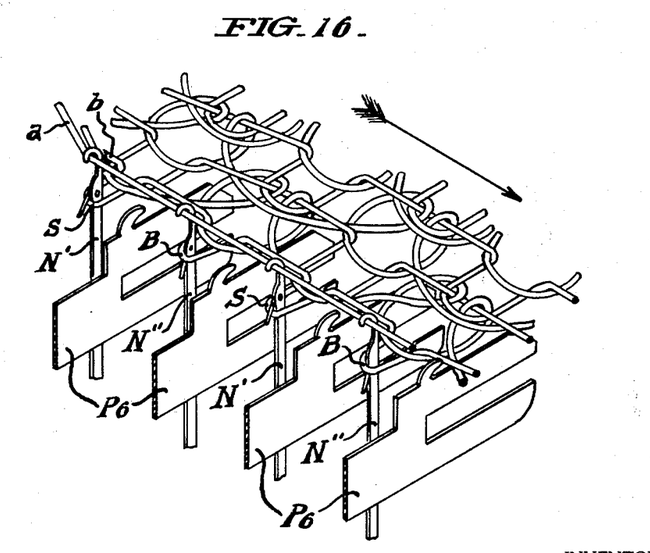

In knitting the fabric in accordance with FIG. 12, all needles approach yarn feeding station I at clearing level and take yarn preparatory to forming a course $b$ (FIG. 13). The needles then are drawn down by the stitch cam 100 to form on the needles a course $b$ of stitches which are, initially, of substantially equal size (FIGS. 14, 15). As the needles approach yarn feeding station II, alternate needles N" are raised to tuck level, while the intervening needles N' are raised to clearing level. Thus, alternate stitches B of course $b$ remain on the needle latches, while the intervening stitches S are cleared from the latches (FIGS. 15, 16).

Figure 17:
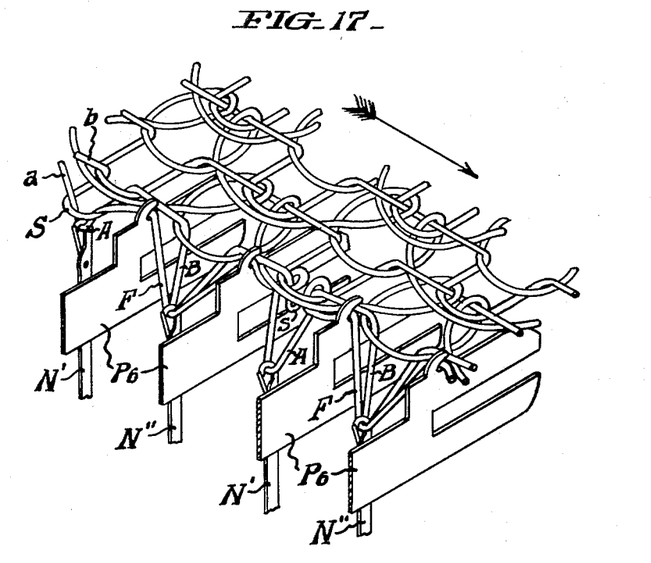
Figure 18:
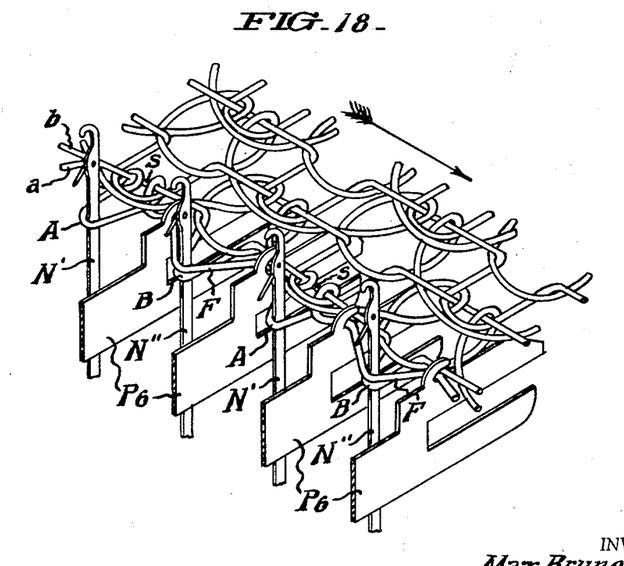

The needles N', N" all take yarn at yarn feeding station II and are drawn down by stitch cam 105 to form on the needles a course $a$ composed of alternate tuck loops F and intervening stitches A (FIGS. 17, 18). The intervening stitches S of course $b$ are cast off the needles N', but the alternate stitches B remain under the hooks of the needles N" and are pulled down by stitch cam 105 together with tuck loops F. As the stitches B are drawn downward again, they are elongated by drawing yarn from the cast off stitches S (FIGS. 17, 18), causing stitches S to become substantially shortened. In FIG. 18, the stitches S are shown as being completely unknitted, although in practice they actually may have a slight loop formation, since the fabric is still under tension while on the knitting needles.

Following the formation of course $a$ on the needles, all needles eventually are again raised to clearing level as they approach yarn feeding station I for the knitting of another course $b$.

Figure 19:
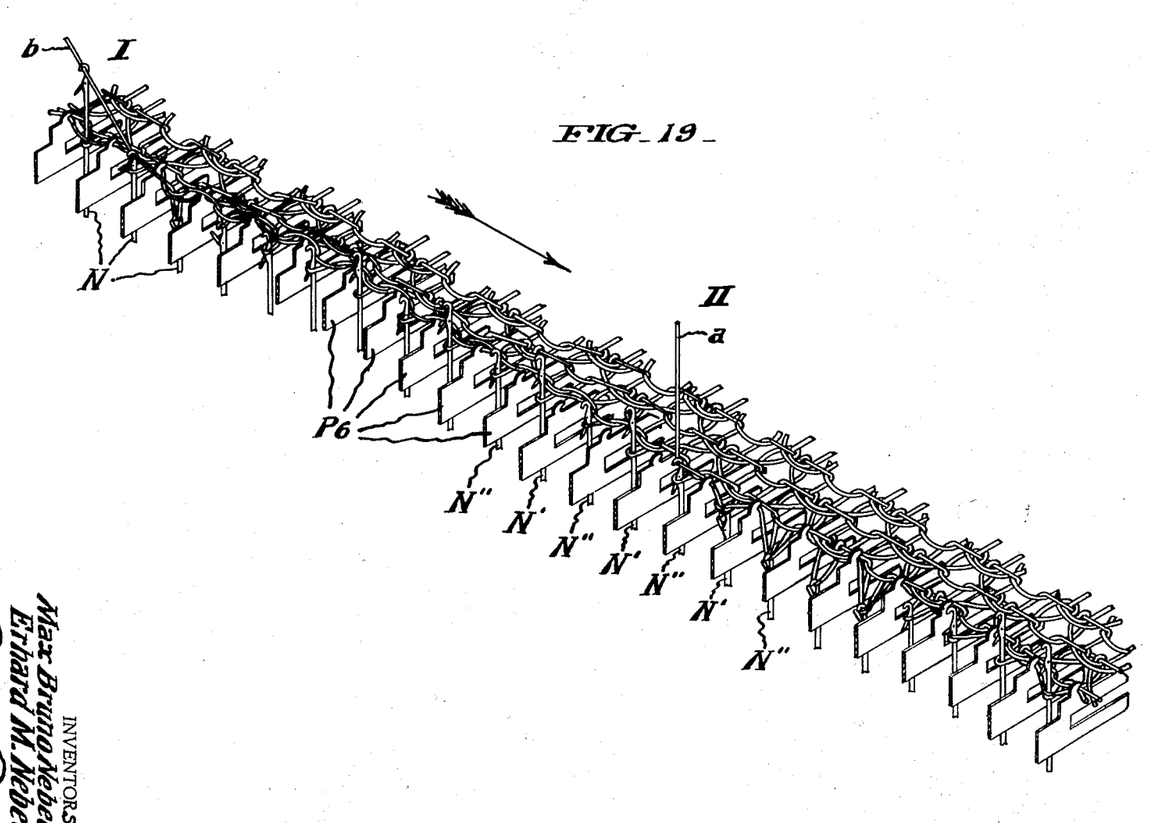
FIG. 19 is a fragmentary, schematic development in perspective illustrating a preferred method of knitting the run-resistant fabric of this invention in accordance with the method of FIGS. 12–18.

In practice, it has been found that a highly satisfactory run-resistant fabric of the type shown in FIGS. 1, 1a may be knitted in accordance with the method of FIGS. 12-18 by feeding the yarn at station I to the needles behind the nebs $ph$ of the sinkers P6, while feeding the yarn at station II to the needles in front of the sinker nebs. This knitting arrangement is illustrated schematically in FIG. 19 and also is shown in FIGS. 13-18. By drawing yarn for the courses $b$ behind the sinker nebs $ph$, it has been found that a fabric with more uniform stitches is achieved. As shown in FIG. 19, the sinkers P6 are retracted from the needle circle between the yarn feeding stations I and II to transfer the stitches of a course $b$ from behind the sinker nebs to ledge $pd$ in front of the sinker nebs preparatory to forming a course $a$ on the needles.

The direction of rotation of the needle cylinder relative to the knitting cams is indicated by the directional arrows in FIGS. 12-19.

Figure 20:
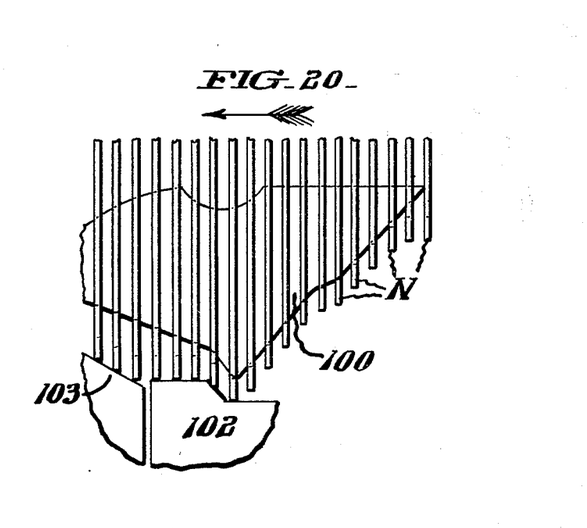
FIGS. 20 and 21 are enlarged, fragmentary views of the stitch cams of FIG. 12.
Figure 21:
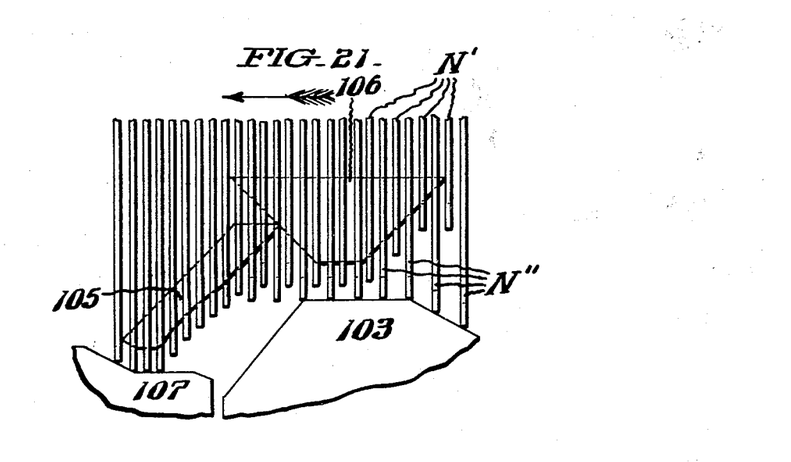

Additionally, highly satisfactory run-resistant results may be achieved by forming the knitting cams at yarn feeding station I so that only one needle is at stitch draw level at a time (FIGS. 14, 20). With this arrangement, "yarn robbing" is promoted between the needle at stitch draw level and the immediate preceding needles, thereby resulting in a shortening of the stitches which form the course $b$. The knitting cams at yarn feeding station II may be formed so that at least two needles are at stitch draw level at a time. In FIG. 21, the knitting cams at station II are formed to provide for four needles being at stitch draw level simultaneously. Such arrangement reduces the "yarn robbing" effect of the needles at station II, thus eliminating any undesirable shortening of the stitches and loops of course $a$. In FIG. 19, three needles are shown at stitch draw level at station II.

In knitting ladies' hosiery on circular machines, it is standard practice to shape or "fashion" the stocking to improve the fit on a wearer's leg by progressively reducing the circumference of the tubular leg portion 10 (FIG. 2) between the knee and the ankle. Such reduction in the stocking circumference is accomplished by reducing the size of the stitches as knitting proceeds toward the ankle. In the typical stocking shown in FIG. 2, the reduction of stitch size usually takes place between the areas indicated by numerals 26 and 29.

In most circular machines used in knitting ladies' hosiery, reduction of stitch size for shaping of a stocking is accomplished by gradually lowering the needle cylinder relative to the knitting cams. In some machines, however, the knitting cams are raised relative to the needle cylinder. Regardless of which technique is employed, the result is to bring the sinkers and knitting cams relatively closer together with consequent reduction of the yarn draw of the needles, thus resulting in a shortening of the lengths of the stitches which are knitted.

In this invention, when passing from a part of a fabric 10 (FIGS. 1, 1a, 2) having one circumference to a part having a smaller circumference, and while reducing the size, i.e., length $x$ of the stitches A and tuck loops F in the direction of knitting of the stocking from the welt to the foot, it is advantageous that the stitches B be reduced in size (in their dimension $x$) in such manner that the small locking stitches S, in their contracted form, maintain a predetermined relative size.

With this invention, the size of the initial loops of the courses $b$ may be progressively reduced at about one half of the rate of reduction in size of the loops of the courses $a$, so that the ratio between the thread lengths of the courses $a$ and $b$ remains substantially the same at all times.

However, if the courses $b$ in the leg fabric area having the largest circumference have a thread length which is more than half the thread length in the courses $a$, then during the gradual reduction of the loop sizes for the smaller circumference portion of the stocking it is desirable that the thread length of the courses $b$ be altered progressively to less than half of the thread length of the courses $a$. In the latter event, however, it is advantageous to make the change in the circumference of the fabric tube, i.e., in the loop sizes, to a lesser degree than normal, so that the increase in the ratio of the thread lengths is less effective in shaping the stocking. Final shaping of the stocking, of course, is obtained by boarding.

With some stocking constructions of this invention, however, it may be desirable to reduce progressively the difference in thread length between the courses $a$ and $b$ as shaping of the stocking progresses. Such method would be advantageous where the courses $b$ initially have a thread length which is half or less than half the thread length of the courses $a$.

In connection with the knitting of a lady's stocking on a multi-feed machine incorporating the fabric of FIGS. 1, 1a, this invention provides for the knitting cams at one feed, at least, to be independently adjustable relative to the axis of the needle cylinder during its lowering to shape the fabric. Preferably, the knitting cams at the yarn feed where the yarn for the courses $b$ is fed is independently movable in the direction of needle motion during axial movement of the needle cylinder. As a result, as the loops in the courses $a$ are progressively reduced in size by axial movement of the needle cylinder relative to the knitting cams, the knitting cams for knitting courses $b$ are adjusted automatically to independently control the size of the stitches of the courses $b$.

With such changes in the loop sizes of the stocking fabric and in the relative positions of the knitting cams axially of the needle cylinder, the motion of the sinkers may change in such a way that during the knitting of courses of increasingly smaller loops, the depth of movement of the sinkers through the needles for cast off becomes proportionately smaller.

Figure 22:
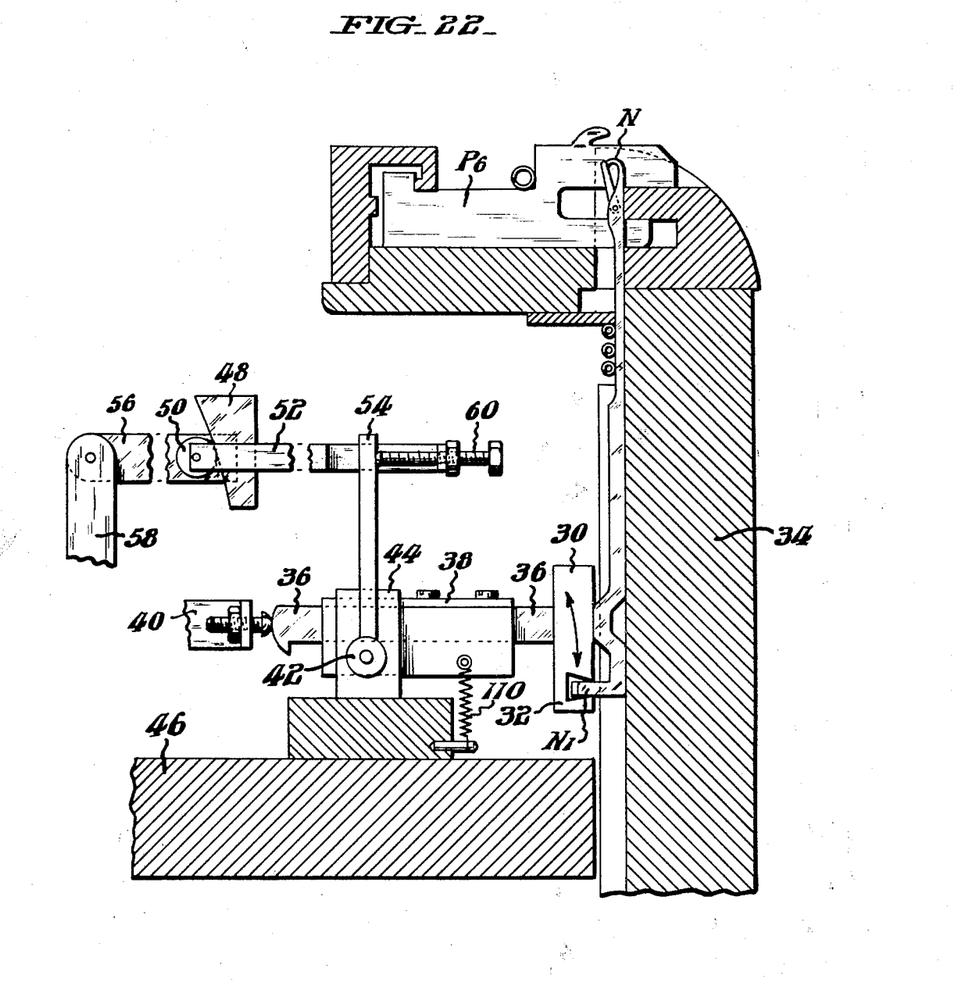
FIG. 22 is a fragmentary, vertical section taken at a yarn feed of a circular knitting machine showing one preferred arrangement for automatically changing the stitch draw level of the needles by movement of the knitting cams.

The novel method of shaping or "fashioning" a circular knit stocking fabric in accordance with this invention, as referred to above, will now be described with particular reference to the method of knitting illustrated in FIGS. 12–19, wherein the difference in thread length of the courses $a$ and $b$ is achieved by positioning the stitch cams 100, 105 to draw the needles at feeding stations I and II to different stitch draw levels. In FIG. 22 such a movable knitting cam arrangement with the essential cooperating devices is shown by way of example, for a yarn feed for courses $b$. The knitting cams 30, 32 are movable towards the needle cylinder 34 independently when required, and also are movable upwardly and downwardly axially, or nearly axially, with respect to the needle cylinder. In FIG. 22, stitch cam 30 and its landing cam 32 are shown as being integral, but these cams may be separate, if desired.

The cams 30, 32 are attached to a slide 36 which is supported in a guide 38 and is displaceable by means of a lever 40 in a horizontal path towards the cylinder 34 so that the cams will act on the needle butts N1 to operate the needles. The cams are withdrawable to terminate operation of the needles. The guide 38 is pinned to the movable shaft 42, which, in turn, is held in a bearing 44 supported by a plate 46. Therefore, the cams 30, 32 can be moved up or down in the direction of travel of the needles N, i.e., in an almost vertical direction.

Spring 110 urges cams 30, 32 in a downward direction. A control cam 48 mounted on link 56 engages a roller 50 mounted on lever 52 which, in turn, is adjustably connected with the vertical lever 54. The lever 54 is connected to the movable shaft 42, so that by vertical movement of the control cam 48, the cams 30, 32 may rise or fall relative to the needle cylinder 34.

The link 56 is rigidly connected to a vertical lever 58 and is movable by means of other levers (not shown), which operate from the same cam which raises and lowers the needle cylinder 34 in the well known way. By means of the adjustable screw 60, the lever 54 is adjustable, and by means of the control cam 48 the knitting cams 30, 32 may be moved independently of the needle cylinder. By this construction, the ratio between the loop sizes and thread lengths of the courses $b$ and $a$ during changes in the loop sizes of the stockings, may be controlled as desired.

It is to be understood that the knitting cams at the yarn feed for forming the courses $a$ may or may not be independently and automatically adjusted by the control means of FIG. 22 during knitting. If desired, the invention may be utilized to provide such knitting cam control means at all yarn feeds, whereby the stitch cams at all feeds may be selectively positioned as desired independent of any movement of the needle cylinder. In practice, however, at least one set of knitting cams, more conveniently those which form the courses $a$, preferably are stationary, whereby the loops formed with such cams are varied in size solely by movement of the needle cylinder.

In using the movable knitting cam construction of FIG. 22, in connection with producing courses $b$, the cams 30, 32 initially may be positioned at the same yarn drawing level as the knitting cams for the yarn feed producing the courses $a$. Thus, the loops of yarn for the courses $a$ and $b$ will then be formed of equal size, with the method of FIGS. 12–19. Such arrangement would be used, for example, in producing the plain knit welt 20 and afterwelt 22 of the stocking of FIG. 2. Upon commencing production of the leg portion 10 of the stocking, of the run-resistant fabric of FIGS. 1, 1$a$, the knitting cams 30, 32 automatically are elevated with respect to the knitting cams at the feed for courses $a$ to a selected position to produce the courses $b$ of a smaller loop size and thread length in the manner of the invention heretofore described. The leg portion 10 of the stocking then is knit with the knitting cams occupying such relative positions until the portion 28 of the fabric is reached, whereupon the needle cylinder 34 is lowered progressively to reduce the size of the loops which form the courses $a$. Simultaneously, the knitting cams 30, 32 are adjusted automatically relative to the needle cylinder 34, dependent upon the setting of the control mechanism of FIG. 22, to independently control the size of the loops of the courses $b$ as the needle cylinder is lowered. Thus, in the formation of the run-resistant fabric of FIGS. 1, 1$a$, the fabric is "fashioned" or shaped by controlling the positions of the knitting cams relative to the needle cylinder independently of each other, to thereby selectively control the size of the loops formed in the courses $a$ and $b$.

If desired, sinkers P3 (FIG. 6) having yarn sinking notches $px$ may be utilized in lieu of sinkers P6 (FIG. 11) when knitting the run-resistant fabric of this invention in accordance with the disclosures of FIGS. 12–19, 22. With such sinkers, the thread for the courses $a$ is formed into loops on the sinker ledge $pb$ behind the neb $ph$, while the thread for the courses $b$ may be formed into loops on either ledge $pb$, or on ledge $pd$ in front of the sinker neb. When the tuck loops F are formed, the stitches B, which are within the needle hooks, are pulled downwardly into the notches $px$, and thereby are not unduly tensioned during the formation of a course $a$. In connection with the sinker P3, if normal or conventional courses of loops M are formed in the fabric, the sinking of these loops by the needles is done in front of the notch $px$ on the sinking point $pd$ (FIG. 6).

Figure 23:
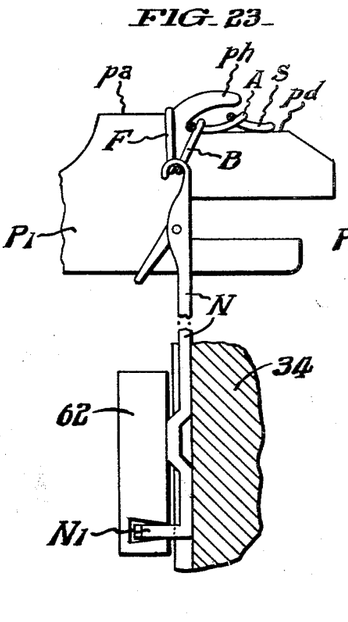
FIGS. 23 and 24 are fragmentary, vertical sections taken at different yarn feeds of a multi-feed circular knitting machine.
Figure 24:
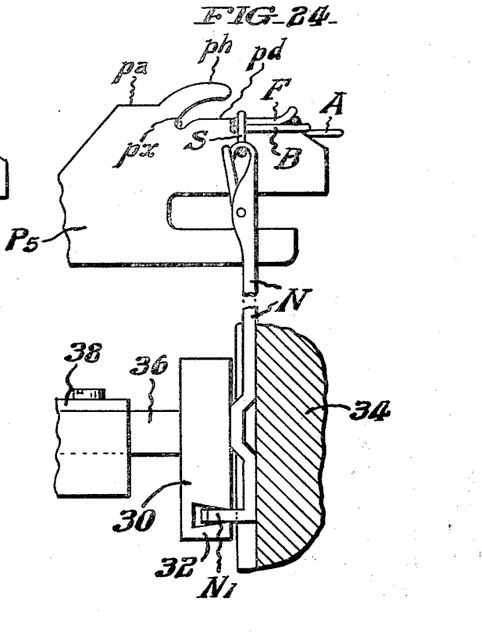

The method of shaping a tubular knit fabric illustrated in FIG. 22 is applicable, of course, to the method of knitting hereinbefore described in respect of sinkers having yarn sinking ledges at different heights (FIGS. 3–5, 7–10). Adaptations of this method of shaping the fabric are illustrated in FIGS. 23 and 24. FIG. 23 shows the knitting of the yarn for a "long yarn" course $a$ with sinkers P1 at a yarn feed whereof the stitch cam 62 is fixed in position. In FIG. 24 there is illustrated the knitting of the yarn for a "short yarn" course $b$ with sinkers P5 at a yarn feed having the movable knitting cams 30, 32 illustrated in FIG. 22.

Figure 25:
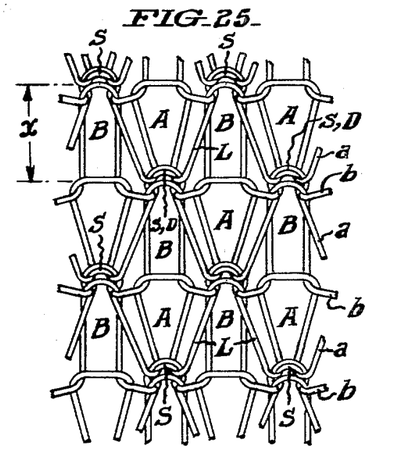
FIG. 25 is a fragmentary, schematic view of a modified run-resistant fabric made in accordance with this invention, the same being stretched walewise.

FIG. 25 shows a modified form of the fabric of FIGS. 1, 1$a$ in a stretched condition. FIG. 25$a$ shows the same type of fabric unstretched, and with a different yarn length ratio. For convenience, the same reference letters are applied to the fabric of FIGS. 25, 25$a$ as to the fabric of FIGS. 1, 1$a$ except in respect of the tuck loops. The tuck loops of the fabric of FIGS. 25, 25$a$ are in modified form, and are designated by the reference letter L.

Figure 25A:
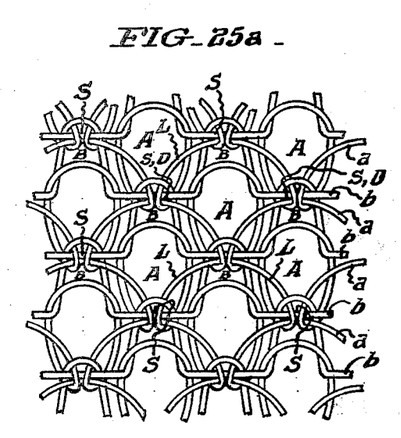
FIG. 25a shows schematically the same type of modified fabric of FIG. 25 unstretched.

Thus, in FIGS. 25, 25$a$ "short yarn" courses $b$ consist of short stitches S and long stitches B in alternation, while the "long yarn" courses $a$ consist of modified tuck loops L and stitches A in alternation. Modified tuck loops L are not doubled with the elongated stitches B, but rather are pulled beyond those stitches and doubled with the small locking stitches S to form the double thread stitches S, D. When the fabric is relaxed and the short stitches S become unknitted and recede back into the stitches B, the bights of the modified tuck loops L recede with them in the manner shown in FIG. 25$a$.

Figure 26:
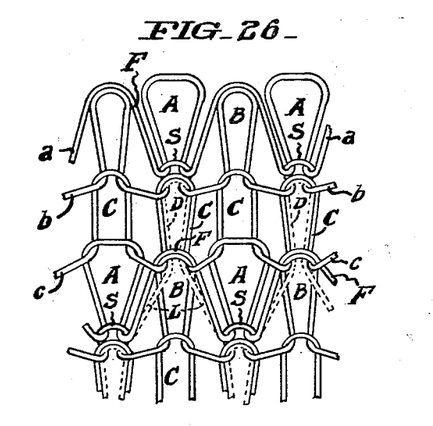
FIGS. 26 and 27 are fragmentary, schematic views of still other modified forms of run-resistant fabric made in accordance with this invention.

The solid line fabric of FIG. 26 is another modified form of the fabric of FIGS. 1, 1$a$. For convenience, the same reference letters are applied to corresponding identical parts of the two fabrics, which differ in the following respects: In FIG. 26, after a course $a$ of stitches A and tuck loops F, there follows at least one course $c$ of conventional stitches C. The thread length in the courses $c$ may be the same as that of courses $b$, or it may be a little longer.

If the tuck loops F remain as conventional tuck loops, they are bound in between the stitches B and C, as shown in full lines in FIG. 26. However, the tuck loops F may be formed as modified tuck loops L and knitted in with the loops in the following course $c$, in which event the double thread stitches C, D alternate in the course $c$ with the single thread stitches C, as shown by broken lines in FIG. 26.

Figure 27:
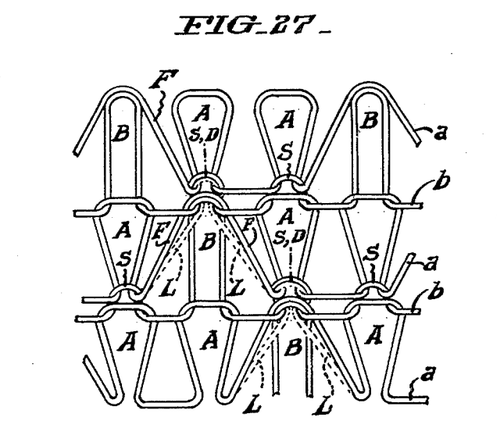

The solid line fabric of FIG. 27 is still another modified form of the fabric of FIGS. 1, 1a. For convenience, the same reference letters are applied to corresponding identical parts of the two fabrics, which differ only in that the tuck loops F alternate with a different frequency in the courses a. Thus, the solid line fabric of FIG. 27 varies from that of FIGS. 1, 1a in that the doubled tuck loops F and stitches B occur in every third wale of a course a. By the same token, as indicated by the broken lines in FIG. 27, the doubled stitches S, D also may be staggered throughout the fabric of FIGS. 25, 25a in this manner. Of course, the mode and frequency of staggering the doubled tuck loops and stitches of the fabric is a matter of choice and may be carried out as desired throughout the fabric. It also will be understood that it is possible to insert in the fabric of FIG. 27, between courses a and b, one or more conventional courses c of plain loops in the manner shown in FIG. 26.

In any of the forms of the run-resistant fabric, the ratio of the thread length of a course a to that of a course b may be further increased by using a yarn with a higher rate of shrinkage for the course b and a yarn with a lower rate of shrinkage for the course a. On the other hand, a fully synthetic false twist, bulked, crimped or other textured yarn may be used for the course a and a fully synthetic yarn with normal shrinkage may be used for the course b, and it is possible to use fully synthetic yarn with normal shrinkage in the course a and a fully synthetic false twist, bulked, crimped or any other textured yarn for the course b.

Reference may be had to U.S. Patents Nos. 3,080,740 and 3,238,746 for the sinker and needle movements necessary for the production of the fabrics illustrated in FIGS. 25, 25a, 26 and 27 incorporating modified tuck loops.

In the claims hereof, the term "alternate" is not intended to be restricted in meaning to indicate a 1 and 1 sequence, i.e., single spaced elements separated by other single elements, but may indicate any uniform sequence of spaced elements, such as 1 and 2, 1 and 3, 2 and 2, 2 and 1, etc.

The term "tuck loop" in the claims is used to indicate both tuck loops F as in FIG. 1 and modified tuck loops L as in FIG. 25.

The term "size" in the claims, as applied to knitted stitches and tuck loops, is used to indicate the length $x$ (FIG. 1) thereof.

Having thus described our invention, we claim:

1. A method of knitting run-resistant fabric on a multi-feed circular knitting machine having a set of needles, including the steps of:
    (a) forming a yarn at one feed on all the needles into knitted stitches of a selected size to provide a course of fabric,
    (b) then forming a yarn at a successive feed on the needles into alternate tuck loops and knitted stitches of a selected larger size to provide a second course of fabric,
    (c) casting off the stitches of the first course from those needles which form stitches in the second course,
    (d) while retaining the stitches of the first course on the needles which form tuck loops in the second course,
    (e) and enlarging said retained stitches by drawing yarn from the cast off stitches of the first course whereby said latter stitches become unknitted.

2. A method of knitting run-resistant fabric on a circular knitting machine having a set of needles and sinkers and at least one yarn feed, including the steps of:
    (a) rotating the needles and sinkers relative to the yarn feed,
    (b) operating the needles and sinkers to form yarn on all the needles into a course of knitted stitches of a selected size,
    (c) then operating the needles and sinkers to form yarn into a second course of spaced tuck loops and intervening knitted stitches of a selected larger size,
    (d) casting off the stitches of the first course from those needles which form stitches in the second course,
    (e) while retaining the stitches of the first course on the needles which form tuck loops in the second course,
    (f) and enlarging said retained stitches by drawing yarn from the cast off stitches of the first course whereby said latter stitches become unknitted.

3. The method of claim 2 further including the step of operating the needles and sinkers to form yarn on all the needles into a third course of knitted stitches.

4. A method of knitting run-resistant fabric on a multi-feed circular knitting machine having a circle of independent needles, a set of knitting cams at each feed and a plurality of sinkers, said method including the steps of:
    (a) positioning the knitting cams at one feed relative to the needles and sinkers to draw the needles to form a course of fabric of a selected length of yarn,
    (b) positioning the knitting cams at the next successive feed relative to the needles and sinkers to draw the needles to form a course of fabric of a selected longer length of yarn,
    (c) operating the needles and sinkers relative to said feeds to form a yarn on all the needles into a course of knitted stitches at the first mentioned feed and to form a yarn into a course of spaced tuck loops and intervening knitted stitches at the second mentioned yarn feed,
    (d) casting off the stitches of the first course from those needles which form stitches in the second course,
    (e) while retaining the stitches of the first course on the needles which form tuck loops in the second course,
    (f) and enlarging said retained stitches by drawing yarn from the cast off stitches of the first course whereby said latter stitches become unknitted.

5. The invention of claim 4 further including the step of forming the knitting cams positioned at the first mentioned feed so that only one needle is at stitch draw level at a time at said feed during knitting of the fabric.

6. The invention of claim 4 further including the step of forming the knitting cams positioned at the second mentioned yarn feed so that at least two needles are at stitch draw level simultaneously at said feed during knitting of the fabric.

7. A method of knitting run-resistant fabric on a circular knitting machine having a circle of independent needles and a plurality of sinkers, each sinker having at least two yarn sinking ledges with one such sinking ledge disposed above another, said method including the steps of:
    (a) operating the needles and sinkers to draw yarn over the lower sinking ledges of the sinkers to form on all the needles a course of fabric composed of knitted stitches of a selected size,
    (b) then operating the needles and sinkers to draw yarn over the higher sinking ledges of the sinkers to form a course of fabric composed of spaced tuck loops and intervening knitted stitches of a selected larger size,
    (c) casting off the stitches of the first course from those needles which form stitches in the second course,
    (d) while retaining the stitches of the first course on the needles which form tuck loops in the second course,
    (e) and enlarging said retained stitches by drawing yarn from the cast off stitches of the first course whereby said latter stitches become unknitted.

8. A method of knitting run-resistant fabric on a circular knitting machine having a circle of independent needles and a plurality of sinkers, each sinker being formed with a neb and having a yarn sinking ledge disposed in front of the neb and a yarn sinking ledge disposed behind the neb at a level above the first mentioned ledge, said method including the steps of:
  (a) operating the needles and sinkers to draw yarn over the lower sinking ledges in front of the sinker nebs to form on all the needles a course of fabric composed of knitted stitches of a selected size,
  (b) then operating the needles and sinkers to draw yarn over the higher sinking ledges behind the sinker nebs to form a course of fabric composed of spaced tuck loops and intervening knitted stitches of a selected larger size,
  (c) casting off the stitches of the first course from those needles which form stitches in the second course,
  (d) while retaining the stitches of the first course on the needles which form tuck loops in the second course,
  (e) and enlarging said retained stitches by drawing yarn from the cast off stitches of the first course whereby said latter stitches become unknitted.

9. A method of knitting run-resistant fabric on a circular knitting machine having a circle of independent needles and a plurality of sinkers, each sinker being formed with a neb and having two yarn sinking ledges disposed behind the neb, one such sinking ledge being elevated above the other, said method including the steps of:
  (a) operating the needles and sinkers to draw yarn over the lower sinking ledges behind the sinker nebs to form on all the needles a course of fabric composed of knitted stitches of a selected size,
  (b) then operating the needles and sinkers to draw yarn over the higher sinking ledges behind the sinker nebs to form a course of fabric composed of spaced tuck loops and intervening knitted stitches of a selected larger size,
  (c) casting off the stitches of the first course from those needles which form stitches in the second course,
  (d) while retaining the stitches of the first course on the needles which form tuck loops in the second course,
  (e) and enlarging said retained stitches by drawing yarn from the cast off stitches of the first course whereby said latter stitches become unknitted.

10. A method of knitting run-resistant fabric on a circular knitting machine having a circle of independent needles and a plurality of sinkers, each sinker being formed with a neb and having a yarn sinking ledge disposed in front of the neb and a yarn sinking ledge disposed behind the neb at a level below the first mentioned ledge, said method including the steps of:
  (a) operating the needles and sinkers to draw yarn over the lower sinking ledges behind the sinker nebs to form on all the needles a course of fabric composed of knitted stitches of a selected size,
  (b) then operating the needles and sinkers to draw yarn over the higher sinking ledges in front of the sinker nebs to form a course of fabric composed of spaced tuck loops and intervening knitted stitches of a selected larger size,
  (c) thereafter casting off the stitches of the first course from those needles which form stitches in the second course,
  (d) while retaining the stitches of the first course on the needles which form tuck lops in the second course,
  (e) and enlarging said retained stitches by drawing yarn from the cast off stitches of the first course whereby said latter stitches become unknitted.

11. A method of knitting run-resistant fabric on a multi-feed circular knitting machine having a stitch cam at each feed, a cylinder with a complement of independent needles and a plurality of sinkers, each sinker having at least two yarn sinking ledges with one such sinking ledge disposed above another, said method including the steps of:
  (a) rotating the needle cylinder relative to the feeds to form fabric,
  (b) operating the needles and sinkers at one feed to draw yarn over the lower sinking ledges of the sinkers to form spaced courses of fabric containing knitted stitches initially of a selected uniform size,
  (c) operating the needles and sinkers at the next successive feed to draw yarn over the higher sinking ledges of the sinkers to form intervening courses of fabric immediately successive to said spaced courses and containing knitted stitches of a selected larger size and
  (d) adjusting the positions of the stitch cams relative to the needle cylinder during said relative rotation of the needle cylinder to selectively control the draw of the needles at the yarn feeds to thereby selectively control the size of the knitted stitches formed at each feed.

12. The method of claim 11 further including the steps of:
  (a) varying the size of stitches formed at one feed by moving the needle cylinder axially relative to the stitch cam at said feed and
  (b) controlling the size of stitches formed at another feed as the needle cylinder is moved axially by selectively moving the stitch cam at said feed in the draw direction of the needles.

13. A method of knitting run-resistant fabric on a multi-feed circular knitting machine having a cylinder with a complement of independent needles and a stitch cam at each feed, including the steps of:
  (a) positioning the stitch cam at one feed relative to the needle cylinder to draw needles to a level to form a yarn into knitted stitches of a selected size,
  (b) positioning the stitch cam at the next successive feed relative to the needle cylinder to draw the needles to a different level to form a yarn into knitted stitches of a selected larger size,
  (c) rotating the needle cylinder relative to the feeds and selectively operating the needles relative to said feeds to form a fabric composed of alternate courses containing knitted stitches in selected wales and tuck loops in the intervening wales and of intervening courses preceding each alternate course and containing short stitches in the selected wales and elongated knitted stitches in the intervening wales, the yarn length per course of the intervening courses not exceeding about 70% of the yarn length per course of the alternate courses, and
  (d) controlling the positions of the stitch cams axially of and relative to the needle cylinder during said relative rotation of the needle cylinder to regulate the size of the knitted stitches formed at each feed.

14. The method of claim 13 further including the steps of:
  (a) varying the size of stitches formed at one feed by moving the needle cylinder axially relative to the stitch cam at said feed and
  (b) controlling the size of stitches formed at another feed as the needle cylinder is moved axially by selectively moving the stitch cam at said feed in the direction of axial movement of the needles.

15. A method of knitting run-resistant fabric on a circular knitting machine having a set of needles and sinkers and at least one yarn feed, including the steps of:
  (a) rotating the needles and sinkers relative to the yarn feed, (b) operating the needles and sinkers to form yarn into knitted stititches on all the needles to provide a course of fabric of a selected length of yarn, (c) then operating the needles and sinkers to form yarn into spaced tuck loops and intervening stitches to provide a course of fabric of a selected longer length of yarn, (d) casting off the stitches of the first course from those needles which form the intervening stitches in the second course, (e) while retaining the stitches of the first course on the needles which form tuck loops in the second course, (f) and unknitting the cast off stitches of the first course by enlarging the retained stitches of said course.

16. A method of knitting a stocking or the like on a multi-feed circular knitting machine having a cylinder with a complement of independent needles and a stitch cam at each feed, including the steps of:

(a) feeding yarn to the needles from at least two yarn feeds while the needle cylinder is rotated relative to said feeds, (b) positioning the stitch cams at said yarn feeds at substantially the same level relative to the needle cylinder and knitting a tubular portion with courses of stitches of substantially the same size, (c) thereafter changing the position of said stitch cams relative to each other so that the stitch cam at one of said yarn feeds is elevated above the stitch cam at the next successive of said yarn feeds in the direction of cylinder rotation relative to the feeds, whereby a smaller length of yarn per course is knit in spaced courses of the fabric than in the next successive courses thereof, (d) knitting a second tubular portion incorporating a plurality of said spaced and next successive courses, (e) operating the needles at the yarn feed adjacent the elevated stitch cam to form said spaced courses entirely of knitted stitches initially of a uniform size, (f) operating the needles at the said next successive yarn feed to form said next successive courses of knitted stitches alternating with tuck loops, (g) casting off the stitches of the spaced courses from those needles which form knitted stitches in the next successive courses, (h) while retaining the stitches of the spaced courses on the needles which form the tuck loops in the next successive courses, (i) and unknitting the cast off stitches of the spaced courses by enlarging the retained stitches of said courses.

17. The method of claim 16 wherein the elevated stitch cam is disposed above the stitch cam at the next successive yarn feed to an extent whereby the amount of yarn drawn by the needles for each spaced course is 70% or less of the amount of yarn drawn by the needles for each next successive course.

18. A method of knitting run-resistant fabric on a knitting machine with a plurality of needles and sinkers, including the steps of (a) forming yarn into spaced courses of fabric composed of knitted stitches only and (b) forming yarn into intervening courses of fabric composed of tuck loops in every second wale and knitted stitches in the intervening wales, and wherein (i) the tuck loops and knitted stitches of the intervening courses are formed of a size which is larger than the size of the knitted stitches as initially formed in the spaced courses, (ii) the tuck loops of each intervening course are staggered with respect to the tuck loops of other intervening courses and (iii) the length of yarn per course of the spaced courses does not exceed about 70% of the length of yarn per course of the intervening courses.

19. A method of knitting run-resistant fabric on a knitting machine having needles and sinkers and at least one yarn feed, including the steps of:

(a) feeding yarn to a plurality of needles as the needles and sinkers move relative to each yarn feed, (b) operating the needles and sinkers to form yarn into stitches to provide a course of fabric, (c) then operating the needles and sinkers to form yarn into spaced tuck loops and intervening stitches of a larger size than the size of the stitches in the course aforesaid to provide a second course of fabric of a length of yarn longer than the length of yarn of the first mentioned course, (d) casting off the stitches of the first mentioned course from those needles which form the intervening stitches in the second mentioned course, (e) while retaining the stitches of the first mentioned course on the needles which form tuck loops in the second mentioned course, (f) and unknitting the cast-off stitches of the first mentioned course by enlarging the retained stitches of said course.

20. The method of claim 19 wherein the formation of the said two courses is repeated successively throughout the fabric, with the spaced tuck loops of each second course being staggered with respect to the spaced tuck loops of other such second courses.

21. The method of claim 19 further including the step of forming the first mentioned course of a yarn of relatively greater shrinkability than the yarn from which the second mentioned course is formed.

22. The method of claim 19 further including the step of forming the first mentioned course of a length of yarn not exceeding about 70% of the length of yarn forming the second mentioned course.

23. The method of claim 19 further including the step of operating the needles and sinkers to form yarn into a third course of stitches, said third course not containing unknitted stitches.

24. The method of claim 20 further including the step of forming the first mentioned course of a yarn of relatively greater shrinkability than the yarn from which the second mentioned course is formed.

25. The method of claim 20 further including the step of forming the first mentioned course of a length of yarn not exceeding about 70% of the length of yarn forming the second mentioned course.

26. The method of claim 20 further including the step of operating the needles and sinkers to form yarn into a third course of stitches, said third course not containing unknitted stitches.

27. A multi-feed circular knitting machine provided with a needle cylinder and with a stitch cam at each feed, at least one of said stitch cams being movable axially relative to the cylinder, said machine including:

(a) means for raising and lowering the needle cylinder relative to the stitch cams and (b) means for automatically and independently moving the movable stitch cam concurrently with the lowering of the needle cylinder, said means including (i) a vertically movable control cam, (ii) a horizontally movable control cam follower connected to the movable stitch cam, (iii) resilient means for urging the movable stitch cam vertically downward while maintaining the cam follower in contact with the control cam and (iv) cam controlled means for adjusting the control cam relative to the cam follower to vary the position of the movable stitch cam.

(References on following page)

References Cited

UNITED STATES PATENTS

| | | | |
|---|---|---|---|
| 2,582,465 | 1/1952 | St. Pierre | 66—108 |
| 2,257,719 | 9/1941 | Smith | 66—172 |
| 3,029,619 | 4/1962 | Lawson | 66—55 |
| 3,080,740 | 3/1963 | Nebel | 66—108 |
| 3,238,746 | 3/1966 | Nebel | 66—169 |
| 3,293,885 | 12/1966 | Nebel | 66—169 |
| 3,318,113 | 5/1967 | Nebel | 66—108 |
| 2,609,677 | 9/1952 | Picard | 66—198 X |
| 3,027,737 | 4/1962 | Matthews et al. | 66—172 |
| 3,052,110 | 9/1962 | Heggie | 66—172 |
| 2,921,454 | 1/1960 | Shastany | 66—108 |
| 2,529,181 | 11/1950 | Page | 66—108 |
| 1,123,924 | 1/1915 | Quinn | 66—198 |
| 1,536,946 | 5/1925 | Sutphen | 66—40 |
| 1,831,129 | 11/1931 | Minton et al. | 66—54 X |
| 1,880,158 | 9/1932 | Siegel | 66—42 X |
| 2,022,157 | 11/1935 | Siegel | 66—169 |
| 2,042,149 | 5/1936 | Gastrich | 66—198 X |
| 2,963,887 | 12/1960 | Page et al. | 66—54 |
| 2,970,459 | 2/1961 | Hart et al. | 66—54 X |
| 2,057,375 | 10/1936 | Friedman | 66—169 |
| 2,141,999 | 12/1938 | NcNamee | 66—198 |
| 2,190,409 | 2/1940 | Maier | 66—169 |
| 2,315,138 | 3/1943 | Smith | 66—42 X |
| 2,374,857 | 5/1945 | Fregeolle | 66—108 |
| 2,378,946 | 6/1945 | Page | 66—107 |
| 2,379,649 | 7/1945 | Nebel | 66—169 |
| 2,005,093 | 6/1935 | Lieberknecht | 66—169 |
| 2,012,607 | 8/1935 | Houseman | 66—55 X |
| 2,369,780 | 2/1945 | Fregeolle | 66—42 X |
| 2,842,947 | 7/1958 | Lindner et al. | 66—202 |

FOREIGN PATENTS

| | | |
|---|---|---|
| 138,309 | 6/1960 | U.S.S.R. |
| 615,960 | 10/1926 | France. |
| 419,348 | 11/1934 | Great Britain. |
| 548,017 | 9/1956 | Italy. |
| 741,330 | 11/1943 | Germany. |

WILLIAM CARTER REYNOLDS, *Primary Examiner.*

U.S. Cl. X.R.

66—55, 57, 108